Patented Mar. 23, 1948

2,438,318

UNITED STATES PATENT OFFICE 2,438,318

INCREASING ADHESION OF BITUMINOUS MATERIALS TO MINERAL AGGREGATE

James M. Johnson, New York, N. Y., assignor to Nostrip Inc., a corporation of Delaware No Drawing. Application September 29, 1942, Serial No. 460,175

2 Claims. (Cl. 106—281)

This invention relates to an aggregate treating composition and particularly to a composition for use in treating paving aggregate so as to promote wetting of the aggregate by bituminous paving compositions and adherence of the paving composition to the aggregate.

There have been proposed numerous treatments to improve the wetting of aggregate by asphaltic and like paving compositions. Most of the treatments proposed are to be made upon the paving composition that is to be mixed with the aggregate. It has been proposed, however, to treat the aggregate before it is mixed with the remainder of the paving composition. In any case, the treating compositions used have ordinarily been anhydrous and, therefore, relatively expensive per unit of volume.

The present invention provides a treating composition that may be and preferably is used in a medium consisting largely of water and that when applied produces the desired effect upon the aggregate, the effect not being removed by exposure of the aggregate during storage to rain or to conditions that are usual in mixing of paving materials including heating of the aggregate before incorporation into asphalt or the like.

Briefly stated, the invention comprises a paving aggregate treating composition comprising the salt of a surface active amine with a freely water soluble acid. In the preferred embodiment the invention comprises a dilute aqueous solution (or dispersion) of such a composition in which the water soluble acid used is volatile.

The treatment of any usual type of paving aggregate with such a composition causes the aggregate to be wet readily when mixed with quickly flowable bituminous compositions even though the aggregate used may be strongly hydrophilic and may be either wet or cold or both when the bituminous material is applied. Types of aggregate which when wet cannot ordinarily be coated continuously and satisfactorily by asphalt compositions, for example, are easily and permanently coated after the aggregate has been subjected to treatment with the present composition in advance of the application of the asphalt.

Once the aggregate has been treated with the composition, its surface remains such as to be readily wet with asphalt or the like even though the treated aggregate is first subjected to heavy streams of water or heated to temperatures as high as about 600° F. before being mixed with warm asphalt. Furthermore, the treated aggregate will stock-pile indefinitely regardless of the climatic conditions under which it is stored.

As the acid used there is employed one that is readily soluble in water. Volatile acids have been used to advantage, including hydrochloric, formic, and acetic acids. Sulphuric acid may be used, but its use commercially is not recommended because amines such as the Nopco C. V. T. are rather difficult to disperse in water after treatment with sulphuric acid.

A particularly satisfactory amine for the present purpose is one made by warming a higher fatty acid and preferably oleic or ricinoleic acid with an equimolecular proportion of an alkalene polyamine, of which polyamine suitable examples are ethylene diamine, propylamine diamine and triethylene polyamine. These products are warmed during manufacture to the temperature at which the amine salts first formed are known to decompose, with the liberation of water and the production of amido-amines of which the oleyl amido-amines are examples. This latter material is known commercially by the name Nopco C. V. T. The class of compounds of which this is an example may be described as acyl amido-amines, the acyl group being that of a higher fatty acid. Such products made from the polyamines contain at least one unreacted $NH_2$ group and are therefore reactive when treated with additional acid as in the process of making the present treating composition.

The selected acid and amine are used to advantage in approximately equivalent proportions so that there is no large excess of either material over that required for the finished salt. If the acid is used in substantial excess, there is introduced difficulties of corrosion of metal equipment in which the composition may at some time be stored, shipped or mixed. If the amine is used in excess of the acid, on the other hand, then there is incomplete conversion of the amine to the desired salt and uneconomical use of the amine.

In general, there is made an aqueous solution of the salt of the selected acid and amine. This solution is preferably first made as a rather thick paste which is then diluted before application to the aggregate. The aqueous solution is first made to contain about 15 to 25% of the salt of the amine and is diluted before use to a readily flowable condition such as obtained, for example, when the concentration of the salt is about 1 to 3 parts by weight for 100 parts of the aqueous solution, the water and the said salt ordinarily constituting practically all of the solution. When the proportion of the salt in the solution applied to the aggregate is substantially less than 1%, imperfect results are obtained in the treatment of the aggregate. When the concentration of the salt in the treating solution is substantially above 3%, then there is involved unnecessary expense in the treating composition.

When Nopco C. V. T. is used as the amine and hydrochloric acid as the acid, as is preferably the case, the acid is used in the proportion of about 8 parts by weight of the commercial 35% solution to 20 parts of the Nopco C. V. T.

In a typical example, 8 parts of the hydrochloric acid are diluted before use by the addition of 72 parts of water. Twenty parts of Nopco C. V. T. are then introduced and stirred into the diluted hydrochloric acid. The product is a pasty mass. Before use this pasty mass is further diluted with about 9 times its weight of additional water so that there is formed a readily flowable solution containing approximately 2% of the Nopco C. V. T. in the form of the hydrochloric acid salt. In the use of the composition, the aggregate either wet or dry is placed in any commercial type of mixing machine and the dilute aqueous solution of the amine salt is added, say in the ratio of about 0.3 to 1.5 parts of the solution to 100 parts of the aggregate. Ordinarily I use about 0.4% of the 2% solution in the treating of the usual grades of aggregate. After the selected amount of the treating solution is added and preferably also during the addition of the solution, the whole is thoroughly stirred so that the treating solution completely coats the surfaces of the aggregate.

The composition and process described is useful in the treating of paving aggregate such as the usual broken stone, slag, or gravel. It imparts to the surfaces of such aggregate the desired wettability by and adherence to hot asphalt, asphalt or tar paving compositions, and like flowable bituminous materials or mixtures. The bituminous material and the aggregate are mixed together in usual manner and at usual elevated temperatures to render the bituminous material readily flowable.

It will be understood that it is intended to cover all changes and modifications of the example of the invention herein chosen for the purpose of illustration which do not constitute departures from the spirit and scope of the invention.

What I claim is:

1. A paving material comprising stony aggregate and a salt of an acylamidoamine containing at least 1 free amine group with a freely water soluble acid, the salt being disposed as a film on the aggregate and serving to increase the adherence of a flowable bituminous material when contacted with the aggregate and applied film, the acyl in the amidoamine being the acyl group of a higher fatty acid and the amine group which is reacted with the water soluble acid, to form the salt, being unsubstituted.

2. A paving material as described in claim 1, the water soluble acid being used in amount approximately equal to that required to react with the free amine present originally in the acylamidoamine.

JAMES M. JOHNSON.

REFERENCES CITED

The following references are of record in the file of this patent:

UNITED STATES PATENTS

| Number | Name | Date |
|---|---|---|
| 1,947,951 | Neelmeier et al. | Feb. 20, 1934 |
| 2,191,295 | Dohse et al. | Feb. 20, 1940 |

OTHER REFERENCES

Proceedings of the Association of Asphalt Paving Technologists, vol. 12, June 5, 1941; pages 3–11.

---

Certificate of Correction

Patent No. 2,438,318.                                                                March 23, 1948.

JAMES M. JOHNSON

It is hereby certified that error appears in the printed specification of the above numbered patent requiring correction as follows: Column 2, line 14, for "propylamine diamine" read *propylene diamine*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.* imperfect results are obtained in the treatment of the aggregate. When the concentration of the salt in the treating solution is substantially above 3%, then there is involved unnecessary expense in the treating composition.

When Nopco C. V. T. is used as the amine and hydrochloric acid as the acid, as is preferably the case, the acid is used in the proportion of about 8 parts by weight of the commercial 35% solution to 20 parts of the Nopco C. V. T.

In a typical example, 8 parts of the hydrochloric acid are diluted before use by the addition of 72 parts of water. Twenty parts of Nopco C. V. T. are then introduced and stirred into the diluted hydrochloric acid. The product is a pasty mass. Before use this pasty mass is further diluted with about 9 times its weight of additional water so that there is formed a readily flowable solution containing approximately 2% of the Nopco C. V. T. in the form of the hydrochloric acid salt. In the use of the composition, the aggregate either wet or dry is placed in any commercial type of mixing machine and the dilute aqueous solution of the amine salt is added, say in the ratio of about 0.3 to 1.5 parts of the solution to 100 parts of the aggregate. Ordinarily I use about 0.4% of the 2% solution in the treating of the usual grades of aggregate. After the selected amount of the treating solution is added and preferably also during the addition of the solution, the whole is thoroughly stirred so that the treating solution completely coats the surfaces of the aggregate.

The composition and process described is useful in the treating of paving aggregate such as the usual broken stone, slag, or gravel. It imparts to the surfaces of such aggregate the desired wettability by and adherence to hot asphalt, asphalt or tar paving compositions, and like flowable bituminous materials or mixtures. The bituminous material and the aggregate are mixed together in usual manner and at usual elevated temperatures to render the bituminous material readily flowable.

It will be understood that it is intended to cover all changes and modifications of the example of the invention herein chosen for the purpose of illustration which do not constitute departures from the spirit and scope of the invention.

What I claim is:

1. A paving material comprising stony aggregate and a salt of an acylamidoamine containing at least 1 free amine group with a freely water soluble acid, the salt being disposed as a film on the aggregate and serving to increase the adherence of a flowable bituminous material when contacted with the aggregate and applied film, the acyl in the amidoamine being the acyl group of a higher fatty acid and the amine group which is reacted with the water soluble acid, to form the salt, being unsubstituted.

2. A paving material as described in claim 1, the water soluble acid being used in amount approximately equal to that required to react with the free amine present originally in the acylamidoamine.

JAMES M. JOHNSON.

REFERENCES CITED

The following references are of record in the file of this patent:

UNITED STATES PATENTS

| Number | Name | Date |
|---|---|---|
| 1,947,951 | Neelmeier et al. | Feb. 20, 1934 |
| 2,191,295 | Dohse et al. | Feb. 20, 1940 |

OTHER REFERENCES

Proceedings of the Association of Asphalt Paving Technologists, vol. 12, June 5, 1941; pages 3–11.

---

Certificate of Correction

Patent No. 2,438,318.                                                     March 23, 1948.

JAMES M. JOHNSON

It is hereby certified that error appears in the printed specification of the above numbered patent requiring correction as follows: Column 2, line 14, for "propylamine diamine" read *propylene diamine*; and that the said Letters Patent should be read with this correction therein that the same may conform to the record of the case in the Patent Office.

Signed and sealed this 25th day of May, A. D. 1948.

[SEAL]

THOMAS F. MURPHY,
*Assistant Commissioner of Patents.*